219-121 SR
12/15/87 OR 4,713,520

United States Patent [19]
Van Nice et al.

[11] Patent Number: 4,713,520
[45] Date of Patent: Dec. 15, 1987

[54] METHOD AND APPARATUS FOR INTERCONNECTING AND HERMETICALLY SEALING CERAMIC COMPONENTS

[75] Inventors: H. Lee Van Nice, Hillsboro; Myron A. Bostwick, Jr., Banks; Keith F. Kongslie, Beaverton, all of Oreg.

[73] Assignee: Tektronix, Inc., Beaverton, Oreg.

[21] Appl. No.: 843,488

[22] Filed: Mar. 24, 1986

[51] Int. Cl.[4] .............................................. B23K 26/00
[52] U.S. Cl. ...................... 219/121 LC; 219/121 LD; 313/477 R
[58] Field of Search ................. 219/121 LC, 121 LD, 219/121 EC, 121 ED; 313/477 R; 445/45, 44; 220/2.1 A; 250/213 VT; 228/122, 175

[56] References Cited

U.S. PATENT DOCUMENTS 2,782,952 2/1957 Dalton et al. .................. 313/477 R
2,912,340 11/1959 Pincus ................................. 501/119

*Primary Examiner*—C. L. Albritton
*Attorney, Agent, or Firm*—John D. Winkelman; David P. Petersen

[57] ABSTRACT

A hollow enclosure has first and second ceramic walls interconnected and hermetically sealed by first and second compact coupling assemblies. In one form, each coupling assembly includes a first flange portion, a web portion and second flange portion. The first flange portion of the first coupling assembly is fritted to a first annular edge of the first ceramic wall. The first flange portion of the second coupling assembly is fritted to a second annular edge of the second wall. The second flanges of the coupling assemblies are then placed against one another and laser welded, without the need for thermal clamps.

12 Claims, 5 Drawing Figures

METHOD AND APPARATUS FOR INTERCONNECTING AND HERMETICALLY SEALING CERAMIC COMPONENTS

TECHNICAL FIELD

This invention relates to a method and apparatus for interconnecting and hermetically sealing ceramic components, such as components of cathode-ray tube envelopes or other hollow enclosures.

BACKGROUND OF THE INVENTION

One prior art approach for joining a ceramic funnel wall of a cathode-ray tube envelope to a ceramic ring wall of such envelope employs a pair of couplers for this purpose. Each of these couplers is formed of two annular pieces. The first piece is of Ni-Cr-Fe alloy and is of L-shaped cross section with a flat base ring portion and a rectangular-tubular portion which projects from one edge of the base portion. One such alloy is sold under the brand name Sealmet. The second piece is a nickel-iron alloy flat rectangular ring which is brazed to the projecting edge of the tubular portion. To join the ceramic funnel wall to the ceramic ring wall, a multiple-step process is used. First, the base ring portion of one of the couplers is fritted to an edge of the ceramic funnel wall and the base ring portion of the other coupler is fritted to an edge of the ceramic ring wall. The faces of the base ring portions are then positioned to abut one another. Thermal clamps are then temporarily fastened in place in contact with the nickel-steel rings. These clamps provide a heat sink and hold the couplers together. The base ring portions are then welded together at high temperature by tungsten inert gas (TIG) or plasma welding. Thereafter, the thermal clamps are removed.

In the above approach, the use of a thermal clamp is relatively time consuming, but is required to prevent shattering of the ceramic components and failure of the frit joints. During such TIG or plasma welding, the temperature of the couplers rises significantly. Moreover, the frit joint will fail if a large temperature differential exists between the metal couplers and ceramic.

In addition, the coefficients of thermal expansion of the ceramic, which may comprise forsterite, also sometimes called fosterite, and the frit are extremely close. However, the coefficient of thermal expansion of the Ni-Cr-Fe alloy varies significantly from these other coefficients of thermal expansion. This variation occurs over the range of working temperatures to which the frit joint is subjected during welding, processing and also during use of the cathode-ray tube envelope. Consequently, the coupler, frit and ceramic expands and contracts differing amounts and at differing rates. This can lead to cracking of the ceramic and also to failure of the frit joint. This problem is further compounded by the fact that the coefficient of thermal expansion of Ni-Cr-Fe alloy varies depending upon the range of temperatures reached by the alloy prior to use in manufacturing a coupler. Thus, depending upon its thermal history, quantities of chemically identical Ni-Cr-Fe alloy can have different coefficients of thermal expansion.

Furthermore, this prior art approach results in an expanded cathode-ray tube envelope. That is, to accommodate the necessary thermal clamp, the tubular portions of the couplers are typically about one inch high. Therefore, following their connection, the ceramic components are approximately two inches apart, and in the case of a cathode-ray tube, are nearly equal in cross section to the front plate of the tube. Consequently, enlarged cabinetry is required to accommodate oscilloscopes and other equipment which uses cathode-ray tubes with such envelopes.

Thus, the above approach requires time consuming steps to interconnect ceramic components, results in ceramic to ceramic couplings of less than optimum compactness, and provides ceramic to ceramic couplings which suffer somewhat from a lack of reliability.

U.S. Pat. No. 2,912,340 of Pincus discloses a forsterite ceramic material used in vacuum tube envelopes. FIG. 2 of this patent shows metallic discs of titanium, zirconium, or alloys thereof which are sealed to ceramic members 33 and 34. This patent mentions, at column 7, line 64, that these elements are sealed by any known satisfactory soldering or brazing technique. Also, column 7, line 76, through column 8, line 8, discusses the necessity that ceramic elements 33 and 34 have thermal expansion and contraction characteristics which closely approach those of titanium so as to avoid rupturing the ceramic or the seal between the metallic and ceramic elements.

In the Pincus patent, the soldering or brazing techniques are understood to be relatively high temperature techniques (700 degrees Centigrade and higher). In addition, titanium is brazed in a vacuum, which would require a relatively expensive vacuum oven. Furthermore, due to the high temperatures involved in such brazing, frit joints would be destroyed unless the brazing was accomplished in a separate step before fritting. This would add to the time and cost of manufacturing these devices. As another drawback, the high temperatures employed by these techniques would melt glass. This makes such techniques totally inappropriate for interconnecting glass components.

It should also be noted that laser welding of titanium to itself is known in the prior art. In addition, a fillet welding technique is known in which one edge of a first component is positioned to overhang an edge of a second component and then these edges are welded. However, the inventors of the present invention do not know of any use of laser welding in applications in which titanium is also previously fritted to ceramic components.

Therefore, a need exists for a method and apparatus for interconnecting and hermetically sealing ceramic components, which overcomes these and other disadvantages of the prior art.

SUMMARY OF THE INVENTION

In a hollow enclosure which includes a first ceramic wall section with a first annular edge and a second ceramic wall section with a second annular edge, first and second couplers or coupling assemblies are provided for interconnecting the edges of these components. In one form, each of these assemblies includes a first flange portion, a web portion and a second flange portion. To interconnect the ceramic wall sections, the first flange portion of the first coupling assembly is fritted to the first annular edge of the first wall section. In addition, the first flange portion of the second coupling assembly is fritted to the second annular edge of the second wall section. The second flanges are then placed against one another and laser welded together, without requiring thermal clamps. The coupling assemblies are of a compact design which minimizes the distance from the laser weld to the fritted joints. This distance is substantially no greater than necessary to retard conduction of heat sufficiently to prevent failure of the frit joints during the laser welding.

More specifically, in several illustrated embodiments, the coupling assemblies are of a compact C-shaped cross section, for example, 0.330 inches versus 2.0 inches. These coupling assemblies, due to the selection of material parameters, retain and enhance many characteristics of the prior art. They are designed so that they are substantially flush with the outer surfaces of the wall sections. That is, the coupling assemblies do not project outwardly to any significant extent beyond such outer wall surfaces. The C-shaped cross section of these coupling assemblies allows the coupling assemblies to flex and relieve stresses caused by the laser welding. In addition, the C-shaped cross section controls the direction of travel of a thermal shock wave generated during welding as the thermal shock wave approaches the frit joint. This flexing and thermal shock wave direction control minimizes the possibility of failure of the frit joints.

As a feature of one specific embodiment of the invention, the first and second coupling assemblies each include a planar annular flange which comprises the first flange portion. In addition, the coupling assemblies each include an annular member of generally S-shaped cross section which is mounted to and projects outwardly from one of the side surfaces of the annular flange. This latter member forms the web and second flange portions. Together, the annular flange and annular member form a coupler with an overall generally C-shaped cross section.

As another aspect of the invention, the first and second coupling assemblies may be of titanium.

In an alternate embodiment of the invention, the couplers each comprise a flat ring. To interconnect the ceramic components, a first of these rings is fritted to the first annular edge of the first ceramic wall section and a second of these rings is fritted to the second annular edge of the second ceramic wall section. The rings are then placed together and their outer edges are laser welded, without requiring thermal clamps. To prevent shattering of the frit joints during welding, the rings have outer dimensions which are greater than the outer dimensions of the ceramic wall sections. The dimensions of the rings are such that transfer of thermal energy is retarded through the rings during welding, between their outer edges and frit joints, to minimize the possibility of frit joint failure.

It is accordingly one object of the present invention to provide compact connections for interconnecting and hermetically sealing ceramic components.

Still another object of the present invention is to provide a cost effective and rapid method and apparatus for interconnecting and hermetically sealing ceramic components, such as components utilized in cathode-ray tube envelopes or other hollow enclosures.

A further object of the present invention is to provide a low temperature joining method, such as the case in fritting methods, and an apparatus for producing hermetically sealed ceramic to ceramic connections which are resistant to cracking and separation.

Another object of the present invention is to provide a method of interconnecting and hermetically sealing ceramic components with a minimum number of steps and without the need for thermal clamps or vacuum ovens.

These and other objects, features and advantages of the present invention will become apparent with reference to the following description and drawings.

DETAILED DESCRIPTION OF PREFERRED EMBODIMENTS

Figure 1:
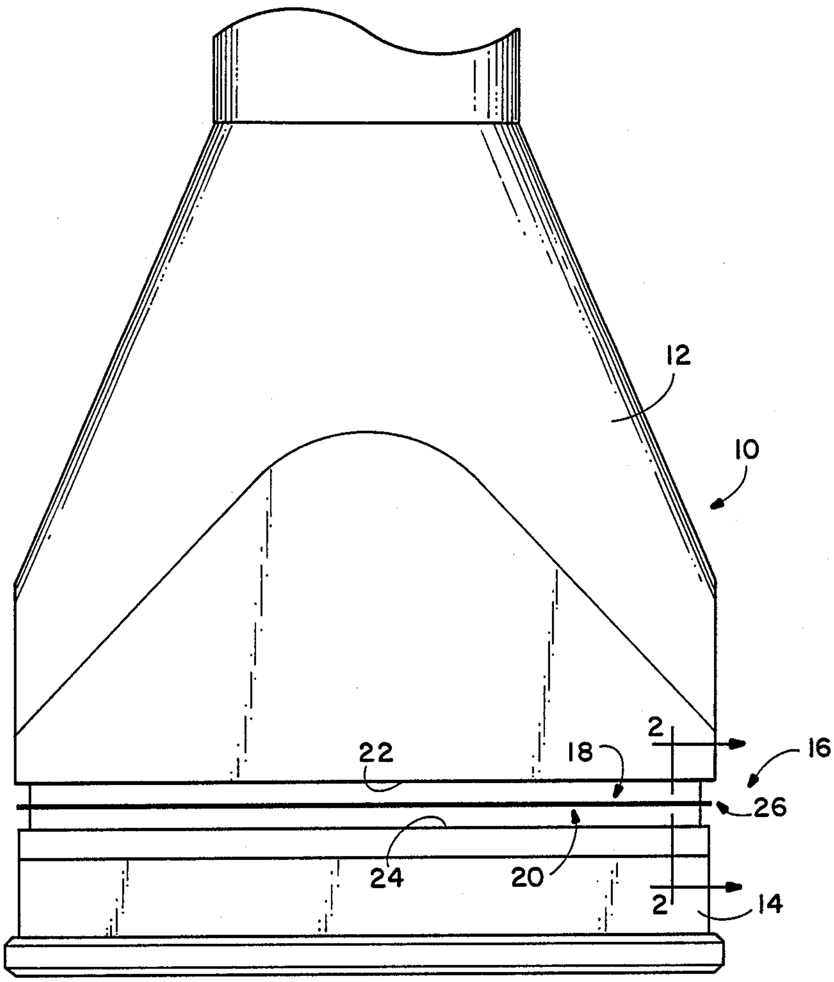
FIG. 1 is a top plan view of a hollow enclosure, in this case a cathode-ray tube envelope, having ceramic components joined together using a method and by an apparatus in accordance with the present invention.
Figure 2:
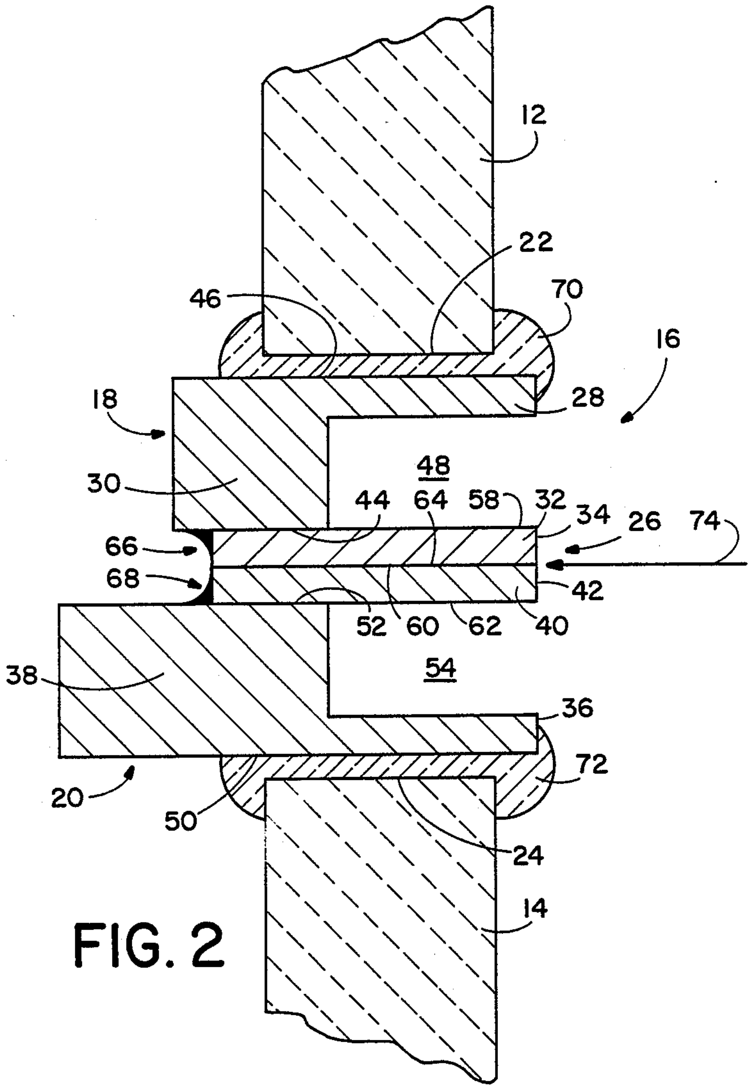
FIG. 2 is a vertical sectional view of ceramic components interconnected in accordance with the present invention, taken along lines 2—2 of FIG. 1.

With reference to FIGS. 1 and 2, a hollow enclosure, such as a cathode-ray tube envelope 10 is shown. Envelope 10 has a ceramic funnel wall 12 and a ceramic ring wall 14. For purposes of this description, the term ceramic is meant to include both glass and crystalline ceramic materials, but not organic materials. The ceramic components 12, 14 are interconnected and hermetically sealed by a coupling mechanism 16 comprised of first and second annular coupling assemblies 18 and 20. During processing, the coupling assembly 18 is mounted to an annular edge 22 of the ceramic funnel wall 12 and the coupling assembly 20 is mounted to an annular edge 24 of the ceramic ring wall 14. The coupling assemblies 18 and 20 are then placed together and joined about the circumference of the coupling mechanism, as indicated generally at 26 in FIG. 1.

More specifically, in the form shown in FIG. 2, the first coupling assembly 18 has a compact C-shaped cross section with a first flange portion 28, a web portion 30 and a second flange portion 32 which has an outer edge 34. Similarly, coupling assembly 20 is of compact C-shaped cross section with a first flange portion 36, a web portion 38, and a second flange portion 40 which has an outer edge 42.

The coupling assemblies 18, 20 are manufactured prior to the mounting of these assemblies to the associated ceramic components and prior to the interconnection of these assemblies. More specifically, the flange portion 28 and web portion 30 of coupling assembly 18 are formed from an annular ring with first and second planar surfaces 44, 46. This is accomplished by machining the surface 44 at the outer periphery of the ring to provide a recess or region of removed material indicated at 48. Thus, the flange portion 28 comprises an annular lip formed in the ring while the web portion 30 comprises a central section of the ring which projects outwardly from the lip. Flange portion 36 and web portion 38 of coupling assembly 20 are also formed by machining an annular ring with planar side surfaces 50, 52 to provide a recess 54. In the illustrated embodiment, the flange portion 32 of coupling assembly 18 is comprised of a ring with first and second flat planar surfaces 58, 60. To complete the coupling assembly 18, the surface 58 is placed against the surface 44 of web portion 30 and these components are joined about their inner circumferences, as by a laser weld 66. This provides a vacuum tight connection of these components. Also, the flange portion 40 of coupling assembly 20 is comprised of a ring with flat surfaces 62, 64. To complete the coupling assembly 20, the surface 62 is placed against the surface 52 of web portion 38 and these components are joined about their inner circumferences, as by a laser weld 68. This also provides an air tight connection of these components.

The coupling assemblies 18 and 20 are thereafter connected to the associated ceramic components 12 and 14. Frit, indicated at 70, joins and hermetically seals the edge 46 of coupling assembly 18 to the edge 22 of the ceramic funnel wall 12. Frit 72 also joins and hermetically seals the edge 24 of the ceramic ring wall 14 to the surface 50 of coupling assembly 20. Fritting is accomplished at a temperature sufficient to devitrify the frit, typically at about 440 degrees Centigrade.

After the fritting step, the flange portions 32 and 40 are held together with surfaces 60 and 64 abutting one another. The entire combination is then rotated. During rotation, a laser beam, indicated at 74, is directed toward the outer edges 34, 42 of the flange portions 32, 40. This welds the flange portions about their periphery and thereby hermetically seals and completes the interconnection of the ceramic components 12, 14. This entire procedure is accomplished without raising the temperature of the interior of the enclosure much above ambient temperature (i.e. 25 degrees Centrigrade). Consequently, temperature sensitive components within the enclosure are protected from excessive temperatures in an environment in which such temperatures would damage the components.

The coupling assembly construction of FIG. 2 is designed so that any straight line, from the location of the application of laser beam 74 to either of the frit joints, passes through one of the gaps or recesses 48, 54. These gaps in effect provide some thermal isolation of the frit joints during the welding step. Thus, no direct straight line exists, from the location of the laser weld to the frit joints, which is totally contained within metal components of the coupling assemblies. Therefore, to travel through metal portions of coupling assembly 18 from the laser weld to edge 46, heat must pass through flange portion 32 and the web portion 30 to this edge. Similarly, to travel through metal portions of the coupling assembly portion 20 to edge 50, heat must pass through flange 42 and web 38. This distance is long enough and the cross section of the metal components is small enough to sufficiently attenuate the thermal shock wave which is generated by rapid localized heating of the outer edges during welding so that this shock wave does not shatter the frit joints. Also, this thermal path is long enough and the cross section of the metal components is small enough to sufficiently retard heat conduction from the outer edges to the frit joint so that the frit joint is not damaged by an excessive temperature differential between the metal coupler and ceramic wall section. However, these thermal paths are not substantially any longer than or cross section any smaller than necessary to retard this heat conduction sufficiently to protect the frit joints. This maintains the compactness of the coupling assemblies and enables the coupling assemblies 18, 20 to be substantially flush with the outer surfaces of the ceramic components 12, 14. In addition, the C-shaped cross section of the couplers flex and relieve strain caused by welding.

Figure 3:
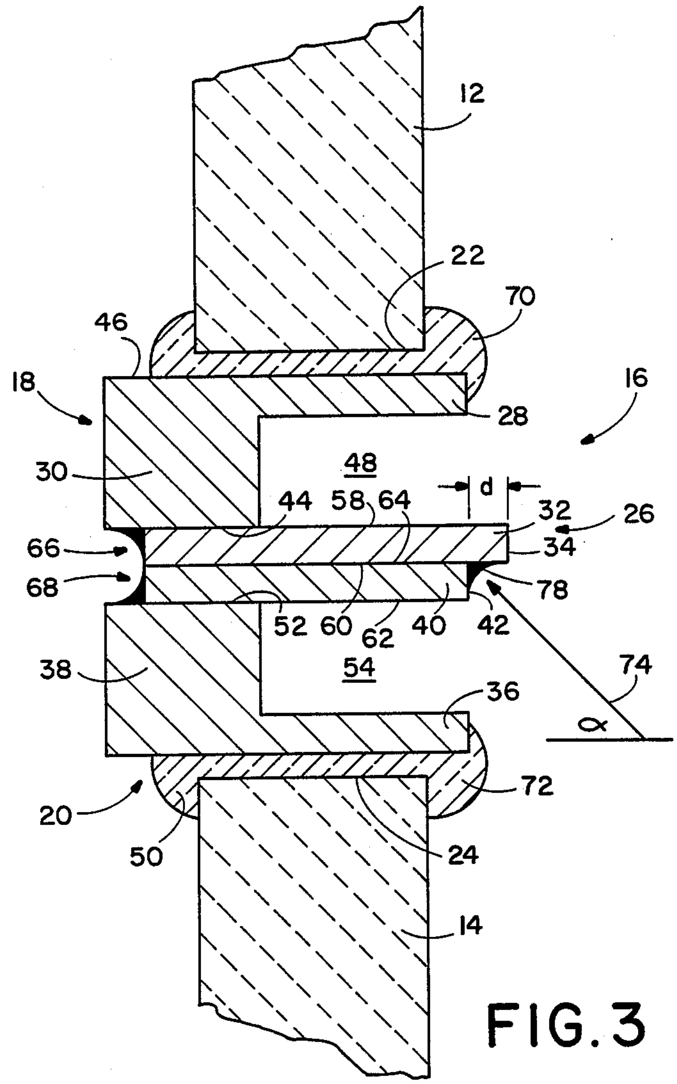
FIG. 3 is a vertical sectional view of ceramic components interconnected in accordance with a second embodiment of the present invention.
Figure 4:
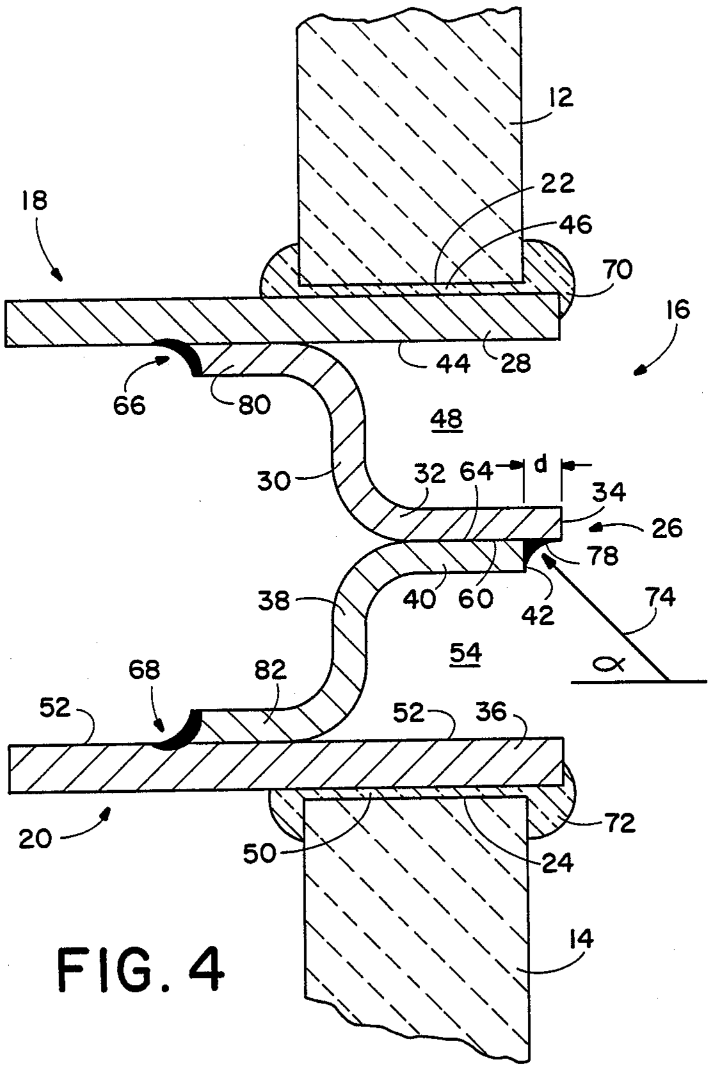
FIG. 4 is a vertical sectional view of ceramic components interconnected in accordance with a third embodiment of the present invention.

In the FIGS. 2, 3 and 4 embodiments of the present invention, each of the coupling assemblies is only about 0.165 inches high. Therefore, the edges 22, 24 of the ceramic walls 12, 14 are only about 0.33 inches apart when joined with the compact couplers of the present invention. Also, the coupler 18 of FIG. 2 is only about 0.3 inches wide in cross section. In addition, each of the flange portions 32, 40 is typically from about 0.015 to 0.030 inches thick, although 0.020 inches is a commonly employed thickness.

It should be noted that when the couplers 18, 20 of FIGS. 2, 3 and 4 were replaced with two couplers of rectangular cross section of the same size, the frit joints shattered during welding. The thermal path in this case was simply too short to sufficiently attenuate the thermal shock wave generated by the welding and to sufficiently retard heat conduction. In contrast, the provision of an air gap in the direct line between the location of the weld and the frit joint, which results from the C-shaped construction of couplers 18, 20, permits the use of compact couplers for interconnecting ceramic components.

The ceramic, frit and coupling assemblies are made of materials with substantially identical coefficients of thermal expansion over the temperature range to which these materials are subjected during the manufacturing steps. Reliable interconnections are believed to be best achieved when materials used for the frit, ceramic and coupling assemblies have coefficients of thermal expansion which are within $3\times10^{-7}$ of one another over the temperature range to which the frit joints are subjected during the manufacturing steps. A typical highest temperature is the temperature reached by the joint during fritting (i.e. 440 degrees Centigrade).

As a specific example, the ceramic material may be either forsterite or glass with coefficients of thermal expansion of approximately $94\times10^{-7}$ over these working temperatures. The frit may be CV-455 frit, which is commercially available from Owens Illinois Company or Corning 7575 frit from the Corning Company. Furthermore, the coupling assemblies may be manufactured of commercially pure titanium. Although there is some variation, titanium designated as "commercially pure" has a typical purity of 99.99 percent. Titanium of this purity has a consistent coefficient of thermal expansion, regardless of the thermal history of the material. Consistent high quality ceramic to metal hermetic seals are available when such materials are used.

The embodiment of FIG. 3, is similar to the embodiment of FIG. 2. Therefore like elements of these embodiments are numbered with the same numbers and will not be discussed in detail. In contrast to FIG. 2, the flange portion 32 of FIG. 3 is somewhat wider in cross section or outside dimension than the flange portion 40. Consequently, the flange portion 32 overhangs the flange portion 40 by a noncritical distance d. During welding, the laser beam 74 is focused on the edge 42 of flange portion 40 as well as on the overhanging portion of flange portion 32. To accomplish this, the laser beam 74 is angled at an angle alpha, such as 45 degrees, with respect to horizontal while flange portions 32 and 40 are horizontal. This produces a weld as indicated at 78.

The FIG. 3 embodiment is somewhat more effective than the FIG. 2 embodiment in providing a hermetic seal. That is, the overlapping or fillet approach of FIG. 3 effectively seals cracks of up to about fifteen thousandths of an inch between the surfaces 60, 64 of flange portions 32, 40. In comparison, the approach of FIG. 2 seals cracks between these flange portions of typically from about three to five thousandths of an inch.

The apparatus and method of FIG. 4 for interconnecting and hermetically sealing ceramic components is similar to that shown in FIG. 3, except that the coupling assemblies are of a somewhat different configuration. Like elements of these figures are designated with like numbers.

As shown in FIG. 4, the first flange portion 28 of this form of coupling assembly 18 comprises a ring with first and second flat planar surfaces 44, 46. This coupling assembly also includes an annular member of recurved or generally S-shaped cross section having a base portion 80 connected by weld 66 to the surface 44. In addition, the central section of this member comprises the web portion 30 and its outer section comprises the flange portion 32. Similarly, the coupling assembly 20 includes a recurved or S-shaped member with a base portion 82 secured by weld 68 to the surface 52 of a first flange portion 36 which comprises a ring. The projecting sections of this latter member comprise the web portion 38 and flange portion 40. These recurved members are punch pressed or otherwise formed in their desired shape. This approach is less costly than an approach which requires machining of the coupling assembly components. Like the FIGS. 2 and 3 forms, the coupling assemblies of FIG. 4 provide a compact interconnection of the ceramic elements 12, 14. In addition, the FIG. 4 coupling assemblies also have somewhat of a C-shaped overall cross section.

The couplers with C-shaped cross section can also be formed in other ways as well. For example, three annular rings may be stacked and connected together. This construction has the desired C-shaped cross section if the center ring is of a smaller outer dimension than the other rings. Also, such couplers can be formed of one piece, for example, by machining a ring to form the C-shaped cross section.

Figure 5:
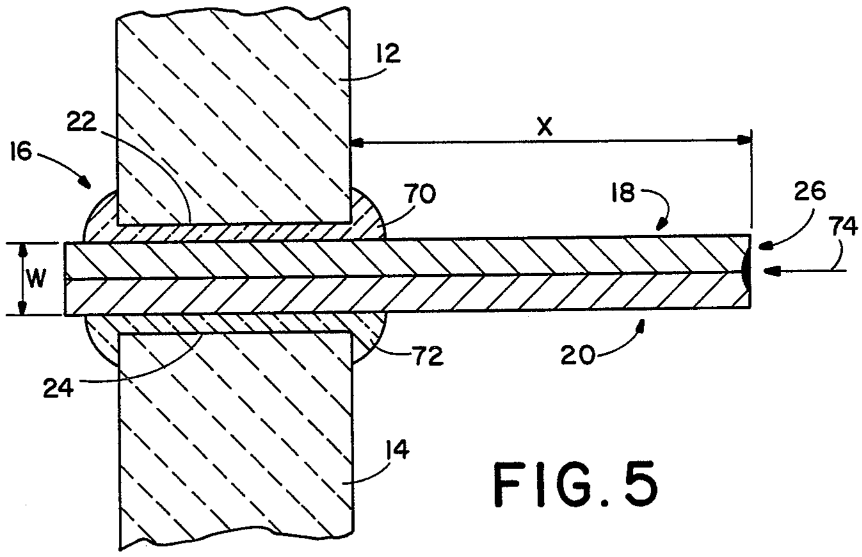
FIG. 5 is a vertical sectional view of ceramic components interconnected in accordance with a fourth embodiment of the present invention.

The FIG. 5 embodiment also has couplers 18, 20, which may be of titanium. In FIG. 5, the couplers each comprise flat rings which are fritted at 70, 72 to the respective ceramic walls 12, 14. Following fritting, the outer edges of these rings are welded by laser beam 74 as indicated at 26. Unlike the flush mounting of the other embodiments, in FIG. 5 the rings project outwardly beyond the outer surfaces of walls 12, 14. This distance is indicated as X in this figure. The distance X and thickness W of each ring are designed to attenuate the shock wave generated during welding and retard the conduction of heat from the weld to the frit joints so that the frit joints do not fail during welding. Typically, the width W is 0.015 inches to 0.030 inches, with 0.20 inches being common. In addition, a typical distance X is 0.150 inches.

Therefore, each of the above embodiments requires a combination of fritting and laser welding of couplers in order to secure and hermetically seal two ceramic components.

Having illustrated and described the principles of our invention with reference to several preferred embodiments, it should be apparent to those persons skilled in the art that such invention may be modified in arrangement and detail without departing from such principals. We claim as our invention all such modifications as come within the true spirit and scope of the following claims.

We claim:

1. In a hollow enclosure that includes a first ceramic wall section having a first annular edge and a second ceramic wall section having a second annular edge, compact coupling means for interconnecting the first and second edges and providing a hermetic seal between them, said coupling means comprising;

first and second annular coupling assemblies each including a first flange portion, a web portion and a second flange portion with an outer edge, the first flange portion of the first coupling assembly being fritted to the first annular edge of the first wall section, the first flange portion of the second coupling assembly being fritted to the second annular edge of the second wall section, and the outer edge of the second flange portion of the first coupling assembly being laser welded to the outer edge of the second flange portion of the second coupling assembly, the thermal path from the laser weld through the second flange portion and web portion to the fritted connection of each coupling assembly being sized such that the coupling assemblies sufficiently attenuate a thermal shock wave generated during laser welding and sufficiently retard heat conduction from the location of the weld to the frit connections to maintain the frit connections intact during laser welding, the thermal path being substantially no longer than necessary to retard such heat conduction.

2. A hollow enclosure according to claim 1 in which the first and second coupling assemblies are of titanium.

3. A hollow enclosure according to claim 1 in which the first and second coupling assemblies each include a planar annular flange with first and second side surfaces which comprises the first flange portion, the first and second coupling assemblies each also including an annular member of generally S-shaped cross section mounted to and projecting outwardly from one of the side surfaces of the planar annular flange so as to provide the web portion and second flange portion.

4. A hollow enclosure according to claim 1 in which the first and second coupling assemblies are of C-shaped cross section, the first and second coupling assemblies each including a first annular flange with a first planar side surface and a second side surface which is recessed at its outer periphery to provide an annular lip and a central section which projects outwardly from the plane containing the lip, the lip comprising the first flange portion and the central section comprising the web portion, the second flange portion comprising a second annular flange with first and second side surfaces, the first side surface being mounted to the central section, and the second side surface of the second annular flange of one coupling assembly abutting the second side surface of the second annular flange of the second coupling assembly.

5. A hollow enclosure according to claim 4 in which one of the second flange portions is of a greater outside dimension than the other of the second flange portions.

6. A hollow enclosure according to claim 1 in which the length of each web portion is no greater than the cross sectional distance through a segment of the coupling assemblies.

7. A hollow enclosure according to claim 1 in which the first and second coupling assemblies are sized such that the distance from the first annular edge of the first wall section through the coupling assemblies to the second annular edge of the second wall section is approximately 0.33 inches.

8. A hollow enclosure according to claim 1 in which the first ceramic wall section comprises a ceramic funnel wall of a cathode-ray tube envelope and the second ceramic wall section comprises a ceramic ring wall of the cathode-ray tube envelope.

9. A method of interconnecting and hermetically sealing first and second ceramic components to one another, comprising:

providing first and second component couplers, each including a pair of flanges joined by a web, fritting one flange of the first coupler to the first component, fritting one flange of the second coupler to the second component, and laser welding the other flanges of the first and second couplers together to interconnect said components and form a hermetic seal between them.

10. A method according to claim 9 in which the frit, first and second couplers and ceramic are of materials having coefficients of thermal expansion which are within $3\times10^{-7}$ of one another over the temperature range to which these elements are subjected to during the steps of claim 9.

11. A method according to claim 9 in which the first and second couplers are of titanium.

12. A method of interconnecting and hermetically sealing a ceramic cathode-ray tube funnel wall to a ceramic cathode-ray tube ring wall comprising;

fritting a titanium coupler to the funnel wall;

fritting a titanium coupler to the ring wall; and laser welding the couplers together.

* * * * *